United States Patent [19]

Bauer

[11] 4,408,340
[45] Oct. 4, 1983

[54] MEANS FOR HOLDING X-RAY FILMS

[75] Inventor: Walter Bauer, Munich, Fed. Rep. of Germany

[73] Assignee: AGFA-Gevaert Aktiengesellschaft, Leverkusen, Fed. Rep. of Germany

[21] Appl. No.: 199,378

[22] Filed: Oct. 21, 1980

[30] Foreign Application Priority Data

Oct. 30, 1979 [DE] Fed. Rep. of Germany ....... 2943853

[51] Int. Cl.³ .............................................. G03B 41/16
[52] U.S. Cl. ..................................... 378/187; 378/188
[58] Field of Search ................. 250/480; 378/185, 187

[56] References Cited

U.S. PATENT DOCUMENTS

| | | | |
|---|---|---|---|
| 2,590,891 | 4/1952 | Reuter | 250/480 |
| 2,590,892 | 4/1952 | Reuter | 250/480 |
| 3,704,369 | 11/1972 | Paidosh | 250/480 |
| 4,264,821 | 4/1981 | Bauer | 250/480 |

*Primary Examiner*—Craig E. Church
*Attorney, Agent, or Firm*—Kontler, Grimes & Battersby

[57] ABSTRACT

A cassette or an analogous supports for sheet-like X-ray films has a bottom wall and a top wall which latter is connected to the bottom wall by a hinge. One of the walls carries a magnetic plate which is overlapped by a first intensifier screen for the X-ray film. The other wall carries a flat flexible receptacle for a ferromagnetic layer therewithin, and the receptacle is overlapped by a second intensifier screen. When a film is inserted between the two screens, the cassette is closed whereby the magnetic layer attracts the ferromagnetic layer with the result that the two screens are biased against the respective sides of the film therebetween. The second screen may constitute an integral part of the receptacle which latter consists of a material, such as paper or synthetic plastic, that is permeable to X-rays. The receptacle forms part of or constitutes a laminate and is floatingly mounted at the inner side of the other wall so that, when the two walls are moved close to each other and the magnetic layer attracts the ferromagnetic layer, the laminate compensates for eventual manufacturing tolerances of the cassette.

3 Claims, 5 Drawing Figures

U.S. Patent
Oct. 4, 1983
4,408,340
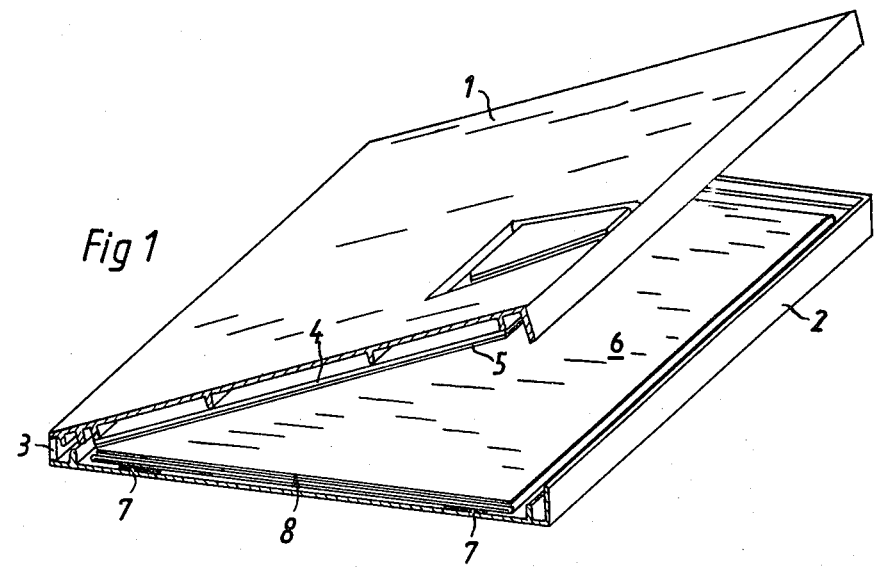
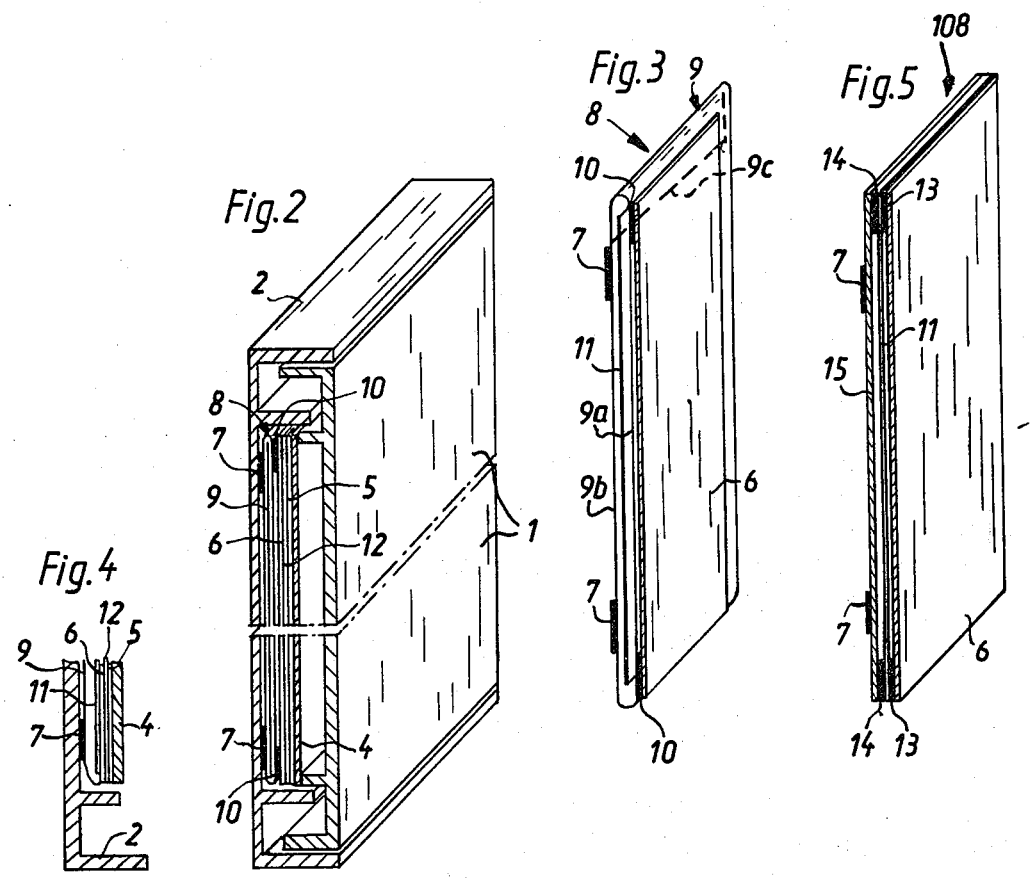

MEANS FOR HOLDING X-RAY FILMS

CROSS-REFERENCE TO RELATED CASE

The arrangement of the present invention can utilize laminates which are similar to those disclosed in the commonly owned copending application Ser. No. 199,377 filed Oct. 21, 1980 by Walter Bauer for "Means for converting X-rays into radiation which darkens X-ray films".

BACKGROUND OF THE INVENTION

The present invention relates to means for holding X-ray films, especially to cassettes or analogous arrangements for holding sheet-like X-ray films at the exposure station. More particularly, the invention relates to improvements in arrangements which serve to hold X-ray films between two intensifier screens by means of magnetic and magnetizable layers. Still more particularly, the invention relates to arrangements wherein a properly inserted sheet-like X-ray film is flanked by two flexible intensifier screens and the screens are urged against the respective sides of the film by a ferromagnetic layer which is outwardly adjacent to one of the screens and by a magnetic plate or layer which is outwardly adjacent to the other screen. The magnetic layer attracts the ferromagnetic layer to thereby bias the screens against the respective sides of the X-ray films.

As a rule, sheet-like X-ray films are inserted into cassettes prior to transfer or transport to the exposure station. However, it is also known to withdraw sheet-like X-ray films directly from a stack or another source of supply and to transfer such films, without resort to cassettes, to the exposure station where the films are confined substantially in the same way as in a cassette, i.e., between two intensifier screens which are urged against the respective sides of the film therebetween by magnetic means, i.e., by a ferromagnetic layer and a magnetic layer which latter attracts the ferromagnetic layer and thereby maintains the screens in full face-to-face contact with the respective sides of the film. Once the film is exposed, it is transported immediately to the developing station.

German Pat. No. 1,112,887 to schlenker discloses a cassette for X-ray films wherein two intensifier screens flank a properly inserted film. One of the screens is flexible and exhibits magnetic properties to cooperate with a layer which consists of iron and is applied directly to the bottom wall of the cassette. A drawback of the patented cassette is that the ferromagnetic layer which is bonded to the bottom wall of the cassette is likely to be scratched or otherwise damaged. As a rule, the ferromagnetic layer is connected to the bottom wall by utilizing a suitable adhesive. The replacement of a damaged ferromagnetic layer is a time-consuming and costly procedure because such layer must be scraped off the inner side of the bottom wall.

Another serious drawback of the patented cassette is that the ferromagnetic layer is likely to become detached from the bottom wall of the cassette in response to pronounced temperature changes. This is due to the fact that the ferromagnetic layer is extremely thin (it serves to admit X-rays against the properly inserted film) and that the heat expansion coefficient of its material often deviates (for example, by a factor of up to 10) from the heat expansion coefficient of the material of the bottom wall. Detachment of the ferromagnetic layer can be complete or partial; for example, the partially detached ferromagnetic layer is likely to wrinkle with attendant adverse influence on the quality of exposed X-ray films. Pronounced fluctuations of temperature are not likely to take place in a laboratory where the temperture is or should be maintained within a rather narrow range; however, the difference between the temperatures of air in a well heated laboratory and in a relatively cool (unheated) storage area often suffice to entail partial or complete separation of the ferromagnetic layer from the bottom wall of the cassette. Further opportunities for separation of the ferromagnetic layer from the cassette arise during shipment of cassettes by air (in the unheated cargo area) or by railroad (especially during the winter season). A wrinkled ferromagnetic layer is unsatisfactory not only because its attracting or pressing action is less than necessary but also because a wrinkled ferromagnetic layer is even more sensitive to tearing or other serious damage which necessitates replacement of such layer with a fresh foil of ferromagnetic material.

OBJECTS AND SUMMARY OF THE INVENTION

An object of the invention is to provide a novel and improved arrangement for holding sheet-like X-ray films during transport to, from and/or at the exposure station in such a way that the components of the holding arrangement are less likely to become damaged, distorted or defaced than in heretofore known arrangements.

Another object of the invention is to provide a novel and improved cassette for retention and transport of removable sheet-like X-ray films.

A further object of the invention is to provide an arrangement wherein the sides of an X-ray film are contacted by two discrete intensifier screens which, in turn, are biased against the film by ferromagnetic and magnetic layers, and wherein the ferromagnetic layer is installed in a cassette or another holding arrangement in such a way that it is not likely to wrinkle, tear or be otherwise damaged after prolonged or relatively short periods of use, even if the arrangement is manipulated by semiskilled or practically unskilled persons.

An additional object of the invention is to provide an arrangement of the above outlined character which is insensitive to or can stand pronounced mechanical and/or temperature-induced stresses.

A further object of the invention is to provide a film holding arrangement which can be shipped by air, by railroad, and/or otherwise, without affecting the quality of its components and/or the positions of such components relative to each other.

Another object of the invention is to provide an arrangement which may but need not constitute or include a cassette for sheet-like X-ray films and which can be utilized as a superior, longer-lasting and less expensive substitute for heretofore known film holding arrangements.

The invention resides in the provision of an arrangement for holding sheet-like X-ray films. The arrangement comprises a support (e.g., a cassette having a bottom wall, a top all and a hinge connecting the two walls to each other so that the top wall can be pivoted relative to the bottom wall or vice versa between a first position in which the cassette is open and a second position in which the cassette is closed), a magnetic layer and an intensifier screen provided on the support (e.g., at the inner side of the top wall and in such a way that the magnetic layer is located between the top wall and the intensifier screen), and a flexible laminate secured to the support (e.g., to the inner side of the bottom wall if the magnetic layer and the intensifier screen are secured to the inner side of the top wall). The laminate includes a ferromagnetic layer and a flat receptacle made of a material, such as paper or synthetic plastic sheet stock, which is permeable to X-rays. One of the two layers (e.g., the magnetic layer, together with the intensifier screen and the top wall of the cassette) is movable toward and away from the other layer (e.g., toward and away from the ferromagnetic layer if the laminate is secured to the bottom wall of the cassette) to press an X-ray film which is placed between the laminate and the intensifier screen against the screen when the ferromagnetic layer is sufficiently close to the magnetic layer to be attracted by the latter.

The laminate comprises a second intensifier screen which may but need not form part of the receptacle and is immediately adjacent to the respective side of a properly inserted film in the closed position of the cassette, i.e., when the ferromagnetic layer is close to and is attracted by the magnetic layer. This causes the two screens to bear against the respective sides of the X-ray film. Thus, one of the screens is adjacent to one side of the film and is disposed between the film and the ferromagnetic layer, and the other screen is adjacent to the other side of the film and is disposed between the film and the magnetic layer. The layers and the screens are flexible, the same as the receptacle which is preferably but need not be open or openable along one edge of the ferromagnetic layer so that the latter can be inspected, if and when the need arises, and replaced without it being necessary to discard the entire receptacle.

The novel features which are considered as characteristic of the invention are set forth in particular in the appended claims. The improved arrangement itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary perspective view of a holding arrangement which embodies one form of the invention and constitutes a cassette for removable sheet-like X-ray films, the cassette being shown in partly open position;

FIG. 2 is a perspective transverse sectional view of the cassette of FIG. 1 in closed position;

FIG. 3 is a fragmentary perspective view of the laminate in the cassette of FIGS. 1 and 2;

FIG. 4 is a fragmentary perspective view of a cassette which constitutes a modification of the cassette shown in FIG. 2; and FIG. 5 is a fragmentary perspective view of a laminate constituting a modification of the laminate which is shown in FIG. 3.

DESCRIPTION OF THE PREFERRED EMBODIMENTS

Referring first to FIG. 1, there is shown a support which constitutes a cassette for X-ray film. The cassette comprises a top wall or cover 1, a bottom wall or base 2, and a hinge 3 which articulately connects the neighboring edge portions of the walls 1 and 2 to each other. The inner side of the top wall 1 is adjacent to and carries a magnetic plate or layer 4 which is in contact with a first intensifier screen 5. The inner side of the bottom wall 2 is connected with bands or strips 7 which are adhesive at both sides and serve to connect the bottom wall with a flexible laminate 8 of the type shown in FIG. 3.

The laminate 8 of FIG. 3 comprises a second intensifier screen 6 having a side facing the bottom wall 2 (when the laminate 8 is installed in the support or cassette of FIG. 1) and carrying strips or bands 10 which are adhesive at both sides so that they adhere to the just mentioned side of the intensifier screen 6 as well as to the adjacent panel 9a of a receptacle 9, e.g., a bag or an envelope. The receptacle 9 is at least substantially closed, i.e., its marginal portions are designed in such a way that they prevent accidental or undesirable escape of an object which is inserted between the panel 9a and the other panel 9b of the receptacle. However, there is no need to provide an airtight seal between the interior and the exterior of the receptacle 9. The aforementioned object is a ferromagnetic layer or foil 11 which is disposed between the panels 9a, 9b of the receptacle 9 and whose thickness is minimal, e.g., a small fraction of one millimeter (for example, 0.02 mm). The ferromagnetic layer 11 is loosely inserted into the receptacle 9; however, since its dimensions are only slightly smaller than those of the panels 9a and 9b, the layer 11 is held against any pronounced shifting in the interior of the receptacle. In fact, the dimensions of the layer 11 can be selected in such a way that this layer retains the position it assumes on insertion between the panels 9a and 9b.

FIG. 2 shows the cassette of FIG. 1 in closed position. A sheet-like X-ray film 12 is disposed between the intensifier screens 5 and 6. The thickness of the laminate 8 (including the screen 6, the two panels 9a, 9b of the recptacle 9 and the ferromagnetic layer 11) and the dimensions of the walls 1, 2 of the cassette are such that, when the cassette is closed, the laminate 8 is rather strongly compressed to thereby flatten the receptacle 9 and the ferromagnetic layer 11 therein.

FIG. 4 illustrates a modification wherein the dimensioning of the cassette including the walls 1 (not shown) and 2 as well as the width of the space between the inner sides of the walls 1, 2 is selected in such a way that the laminate is subjected to a less pronounced compressive stress. Such dimensioning of the cassette may be advisable or accidental, e.g., as a result of unavoidable or permissible manufacturing tolerances. Nevertheless, the ferromagnetic layer 11 in the receptacle 9 is immediately adjacent to the intensifier screen 6 (the same as in FIG. 2) because the thickness of the laminate suffices to ensure at least some compression or compacting of the laminate when the cassette of FIG. 4 is closed. Such close adjacency of the ferromagnetic layer 11 to the magnetic plate 4 (i.e., close adjacency of the intensifier screens 5 and 6 to the X-ray film 12) is guaranteed because the magnetic plate 4 attracts the ferromagnetic layer 11 whereby these parts maintain the screens 5 and 6 in desirable contact with the respective sides of the film 12. Compensation for eventual tolerances takes place in the region between the ferromagnetic layer 11 and the bottom wall 2 of the cassette, i.e., the region which is not in the path of X-rays that are about to impinge on the film 12. The laminate 8 is flexible and can "breathe" to thus compensate for manufacturing tolerances, i.e., for deviations of dimensions of the cassette including the walls 1 and 2 from optimum dimensions. The same holds true if the cassette is replaced with a support of the type used at many exposure stations when the X-ray film is not stored in a cassette, i.e., when a sheet-like X-ray film is drawn directly from a source of supply and is delivered to the exposure station. The just mentioned modified support also comprises means for ensuring that the ferromagnetic layer 11 is held sufficiently close to the magnetic plate 4 so that the intensifier screens 5 and 6 lie flat against the respective sides of the film therebetween.

The use of bands or strips 7 and 10 both sides of which are coated with adhesive is desirable and advantageous because this allows for convenient detachment of the laminate 8 from the bottom wall 2 and/or for convenient detachment of the receptacle 9 from the intensifier screen 6. The same holds true for attachment of a fresh receptacle 9 (or for reattachment of the same receptacle 9) to the intensifier screen 6 as well as for attachment of a fresh laminate 8 or for reattachment of the same laminate to the bottom wall 2. The interval of time which is needed for replacement of the ferromagnetic foil 11 or for replacement of the entire laminate 8 is extremely short and the work can be performed by a semiskilled or even unskilled person.

The broken line 9c denotes a flap along one edge of the layer 11 in the receptacle 9 of FIG. 3. This flap allows for convenient insertion or removal of the layer 11.

The receptacle 9 is made of a material which is permeable to X-rays. For example, the receptacle 9 can be made of paper or a suitable synthetic plastic sheet material. If desired, the laminate 8, and particularly the receptacle 9, can be reinforced by using a thin cardboard insert or an analogous relatively thin plate-like stiffening insert in the interior of the receptacle 9 at that side of the ferromagnetic layer 11 which faces away from the intensifier screen 6.

The adhesive-coated strips 7 and 10 are preferably staggered or offset with reference to each other so as not to unduly increase the thickness of the laminate 8. This is particularly desirable when the cassette or the aforementioned modified support is designed in such a way that its dimensions match or closely approximate the desirable optimum dimensions.

FIG. 5 illustrates a portion of a modified laminate 108 which can be used as a substitute for the laminate 8 of FIG. 3. In the laminate 108 of FIG. 5, the receptacle 9 is replaced by a receptacle having adhesive-coated strips or bands 13 which bond the ferromagnetic layer 11 directly to the intensifier screen 6. More particularly, the strips 13 (each of which has two adhesive coated sides) bond the marginal portions of the layer 11 to the respective marginal portions of the screen 6 so that the strips 13 constitute a circumferentially complete polygonal frame for the major median portion of the layer 11. The reference character 15 denotes an additional or protective layer which is adjacent to the exposed side of the layer 11, i.e., to that side of the layer 11 which faces away from the screen 6. The connection between the protective layer 15 and the ferromagnetic layer 11 is or may be the same as that between the layer 11 and the screen 6 of the laminate 108, i.e., such connection may include a frame consisting of adhesive-coated strips 14 which bond the marginal portions of the layers 11 and 15 to each other. The strips 7 of FIG. 5 serve the same purpose as the strips 7 of the laminate 8, i.e., they bond the laminate 108 to the bottom wall 2 of a cassette or an analogous support when the X-ray films are stored in cassettes during transport toward or away from the exposure station.

The strips 13 and/or 14 need not form uninterrupted (circumferentially complete) frames between the parts 6, 11 and 11, 15 of the laminate 108. The material of the protective layer 15 is preferably the same as or analogous to that of the material (paper, synthetic plastic sheet stock or the like) of the receptacle 9 in the laminate 8 of FIG. 3. All that counts is to ensure that the layer 15 can adequately shield the ferromagnetic layer 11 and is permeable to X-rays.

The laminate 108 is flexible, the same as the laminate 8. The parts 13, 14 and 15 of the laminate 108 can be said to constitute a simplified substitute or equivalent of the receptacle 9 in the laminate 8, i.e., the intensifier screen 6 of the laminate 108 is floatingly mounted on the other components of the laminate 108 and can follow the outline of the film when the laminate 108 is inserted into a cassette or another support. The magnetic attraction of the plate 4 suffices to enable the ferromagnetic layer 11 to urge the intensifier screen 6 against the film and to thereby urge the film against the intensifier screen 5 so that the screen 5 bears against the magnetic layer or plate 4 when the laminate 108 replaces the laminate 8 in the cassette of FIG. 2 or 4. In other words, the laminate 108 is also designed in such a way that its deformability (compressibility) can compensate for tolerances in the manufacture of a cassette or another support for sheet-like X-ray films.

An advantage of the laminate 108 over the laminate 8 is a somewhat reduced cost, especially if the aforementioned reinforcing or stiffening panel for insertion into the receptacle 9 is omitted. On the other hand, the laminate 8 of FIG. 3 exhibits the advantage that the ferromagnetic layer 11 need not be bonded, even in part, to the intensifier screen 6 so that these components of the laminate 8 are free to move relative to each other, e.g., in response to heating or cooling, when the heat expansion coefficient of the material of the layer 11 is different from that of the material of the screen 6. As a rule, the bonding of marginal portions of the layer 11 to the screen 6 and/or to the protective layer 15 is or might be of some consequence in response to pronounced fluctuations of the temperarture of component parts of the laminate 108.

An important advantage of the improved arrangement is that the ferromagnetic layer 11 is shielded against mechanical damage and need not be replaced at all or must be replaced at infrequent intervals. Moreover, the layer 11 is not detached from the adjacent layers, screens, panels, plates or walls because it need not be bonded to such parts at all. Consequently, changes of temperature cannot adversely influence the condition of the arrangement even if the temperature changes are very pronounced, such as those in the storage area of an aircraft prior to and after takeoff. In other words, the layer 11 remains flat irrespective of the temperature of the surrounding atmosphere so that it can cause both intensifier screens to closely adhere to the entire film 12. Furthermore, the layer 11 is not likely to be subjected to unequally distributed stresses which could change its condition by wrinkling, tearing or other adverse influences. Still further, the arrangement can properly urge the two intensifier screens against the respective sides of the film 12 even if the dimensions of the cassette or another support deviate from optimum dimensions, i.e., if the cassette is machined or otherwise produced without close tolerances. Such positioning or mounting of the layer 11 so that it remains flat or practically flat is highly desirable because this ensures that each and every portion of the layer 11 is attracted by the magnetic plate 4 with the same force. This, in turn, prevents the absence of contact between certain portions of the intensifier screens and the film therebetween because such absence of contact results or is likely to entail the development of so-called veils or foggy spots on the X-ray film. Finally, the arrangement of the present invention can employ an extremely thin ferromagnetic foil 11 so that the layer 11 offers a minimal resistance to the penetration of X-rays therethrough, i.e., its absorptivity is minimal.

Since the receptacle is secured to the bottom wall of the cassette and to the nearest intensifier screen (FIG. 3) or is more or less permanently connected with and includes the respective intensifier screen (FIG. 5), the receptacle actually floats in the interior of the support when the latter is opened; this, in turn, renders it possible to properly confine a sheet-like X-ray film when the support is closed (i.e., when the wall 1 is moved sufficiently close to the wall 2 or vice versa so that the magnetic layer or plate 4 can attract the ferromagnetic layer 11) even if the support is not machined with a high or reasonably high degree of precision. In other words, the feature that the receptacle is floatingly mounted in the support can compensate for the absence of close tolerances.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. An arrangement for holding sheet-like X-ray films comprising a support; a magnetic layer and an intensifier screen provided on said support; and a flexible laminate secured to said support, said laminate including a ferromagnetic layer and a flat receptacle for said ferromagnetic layer, said receptacle comprising a second intensifier screen at one side of said ferromagnetic layer, a protective layer at the other side of said ferromagnetic layer and means for securing said second screen to said protective layer, wherein at least one of said layers is movable toward and away from the other of said layers to press a film which is placed between said receptacle and said screen against such screen when said ferromagnetic layer is sufficiently close to said magnetic layer to be attracted by the latter.

2. The arrangement of claim 1, wherein said second screen and said protective layer have neighboring marginal zones and said securing means includes at least one adhesive-coated strip connecting at least a portion of the marginal zone of said second screen to the adjacent portion of the marginal zone of said protective layer.

3. The arrangement of claim 2, wherein said strip forms a circumferentially complete frame around the ferromagnetic layer between said second screen and said protective layer.

* * * * *